United States Patent [19]

Oleck et al.

[11] 4,271,042

[45] Jun. 2, 1981

[54] PROCESS FOR DEMETALATION AND DESULFURIZATION OF PETROLEUM OILS

[75] Inventors: Stephen M. Oleck, Moorestown; Howard S. Sherry, Cherry Hill, both of N.J.; Ronald H. Fischer, Oakton, Va.; Donald Milstein, Cherry Hill, N.J.

[73] Assignee: Mobil Oil Corporation, Fairfax, Va.

[21] Appl. No.: 65,707

[22] Filed: Aug. 10, 1979

Related U.S. Application Data

[60] Continuation of Ser. No. 862,306, Dec. 20, 1977, abandoned, which is a division of Ser. No. 807,764, Jun. 17, 1977, Pat. No. 4,089,774, which is a continuation-in-part of Ser. No. 608,604, Aug. 28, 1975, abandoned.

[51] Int. Cl.³ .................. B01J 27/02; B01J 23/16; B01J 23/85; B01J 24/04
[52] U.S. Cl. .................................... 252/439; 252/465
[58] Field of Search ................................ 252/465, 439

[56] References Cited

U.S. PATENT DOCUMENTS

| 3,751,380 | 8/1973 | O'Hara | 252/439 |
| 4,006,076 | 2/1977 | Christensen et al. | 208/216 PP |
| 4,066,574 | 1/1978 | Tamm | 252/439 |

Primary Examiner—Delbert E. Gantz
Assistant Examiner—William G. Wright
Attorney, Agent, or Firm—C. A. Huggett; M. G. Gilman; E. J. Trojnar

[57] ABSTRACT

This invention is concerned with removing metal and sulfur contaminants from residual oil fractions by catalytic contact with an improved catalyst comprising the oxides or sulfides of a Group VIB metal and an iron group metal supported on an alumina that contains dispersed Delta and/or Theta phase alumina, the catalyst having at least 45% of its pore volume in pores 30 to 150Å diameter, at least 10% of its pore volume in pores less than 30Å diameter, and at least 15% of its pore volume in pores greater than 300Å diameter. The process can be used to prepare feedstock for catalytic cracking.

7 Claims, 3 Drawing Figures

PROCESS FOR DEMETALATION AND DESULFURIZATION OF PETROLEUM OILS

CROSS REFERENCE TO RELATED APPLICATIONS

This is a continuation of copending application Ser. No. 862,306, filed Dec. 20, 1977 now abandoned which is a division of copending application Ser. No. 807,764, filed June 17, 1977 now U.S. Pat. No. 4,089,774, which is a continuation-in-part of U.S. patent application Ser. No. 608,604 filed Aug. 28, 1975, now abandoned.

BACKGROUND OF THE INVENTION

1. Field of the Invention

This invention is concerned with an improved catalytic process for the demetalation and desulfurization of petroleum oils, preferably those residual fractions with undesirably high metals and/or sulfur contents. More particularly, the invention utilizes a demetalation-desulfurization catalyst characterized by novel specifications including pore size distribution. Additionally, this invention involves a method for the preparation of a demetalation-desulfurization catalyst comprising a Group VIB metal and an iron group metal composited with a gamma alumina that contains dispersed Delta and/or Theta phase alumina, said catalyst having a specific pore size distribution, and other specified characteristics described hereinbelow.

2. Description of the Prior Art

Residual petroleum oil fractions produced by atmospheric or vacuum distillation of crude petroleum are characterized by relatively high metals and sulfur content. This comes about because practically all of the metals present in the original crude remain in the residual fraction, and a disproportionate amount of sulfur in the original crude oil also remains in that fraction. Principal metal contaminants are nickel and vanadium, with iron and small amounts of copper also sometimes present. Additionally, trace amounts of zinc and sodium are found in some feedstocks. The high metals content of the residual fractions generally preclude their effective use as charge stocks for subsequent catalytic processing such as catalytic cracking and hydrocracking. This is so because the metal contaminants deposit on the special catalysts for these processes and cause the premature aging of the catalyst and/or formation of inordinate amounts of coke, dry gas and hydrogen.

It is current practice to upgrade certain residual fractions by a pyrolitic operation known as coking. In this operation the residuum is destructively distilled to produce distillates of low metals content and leave behind a solid coke fraction that contains most of the metals. Coking is typically carried out in a reactor or drum operated at about 800° to 1100° F. temperature and a pressure of one to ten atmospheres. The economic value of the coke by-product is determined by its quality, especially its sulfur and metals content. Excessively high levels of these contaminants makes the coke useful only as low-valued fuel. In contrast, cokes of low metals content, for example up to about 100 p.p.m. (parts-per-million by weight) of nickel and vanadium, and containing less than about 2 weight percent sulfur may be used in high valued metallurgical, electrical, and mechanical applications.

Certain residual fractions are currently subjected to visbreaking, which is a heat treatment of milder conditions than used in coking, in order to reduce their viscosity and make them more suitable as fuels. Again, excessive sulfur content sometimes limits the value of the product.

Residual fractions are sometimes used directly as fuels. For this use, a high sulfur content in many cases is unacceptable for ecological reasons.

At present, catalytic cracking is generally done utilizing hydrocarbon chargestocks lighter than residual fractions which generally have an API gravity less than 20. Typical cracking chargestocks are coker and/or crude unit gas oils, vacuum tower overhead, etc., the feedstock having an API gravity from about 15 to about 45. Since these cracking chargestocks are distillates, they do not contain significant proportions of the large molecules in which the metals are concentrated. Such cracking is commonly carried out in a reactor operated at a temperature of about 800° to 1500° F., a pressure of about 1 to 5 atmospheres, and a space velocity of about 1 to 1000 WHSV.

The amount of metals present in a given hydrocarbon stream is often expressed as a chargestock's "metals factor". This factor is equal to the sum of the metals concentrations, in parts per million, of iron and vanadium plus ten times the concentration of nickel and copper in parts per million, and is expressed in equation form as follows:

$$F_m = Fe + V + 10(Ni + Cu)$$

Conventionally, a chargestock having a metals factor of 2.5 or less is considered particularly suitable for catalytic cracking. Nonetheless, streams with a metals factor of 2.5 to 25, or even 2.5 to 50, may be used to blend with or as all of the feedstock to a catalytic cracker, since chargestocks with metals factors greater than 2.5 in some circumstances may be used to advantage, for instance with the newer fluid cracking techniques.

In any case, the residual fractions of typical crudes will require treatment to reduce the metals factor. As an example, a typical Kuwait crude, considered of average metals content, has a metals factor of about 75 to about 100. As almost all of the metals are combined with the residual fraction of a crude stock, it is clear that at least about 80% of the metals and preferably at least 90% needs to be removed to produce fractions (having a metals factor of about 2.5 to 50) suitable for cracking chargestocks.

Metals and sulfur contaminants would present similar problems with regard to hydrocracking operations which are typically carried out on chargestocks even lighter than those charged to a cracking unit. Typical hydrocracking reactor conditions consist of a temperature of 400° to 1000° F. and a pressure of 100 to 3500 p.s.i.g.

It is evident that there is considerable need for an efficient method to reduce the metals and/or sulfur content of petroleum oils, and particularly of residual fractions of these oils. While the technology to accomplish this for distillate fractions has been advanced considerably, attempts to apply this technology to residual fractions generally fail due to very rapid deactivation of the catalyst, presumably by metals contaminants.

U.S. Pat. No. 3,770,617 issued Nov. 6, 1973 describes a hydrodesulfurization process that employs a catalyst having an oxide or sulfide of a Group VIB and/or Group VIII metal on an alumina support characterized by a bimodal pore size range.

SUMMARY OF THE INVENTION

It has now been found that hydrocarbon oils containing both metals and sulfur contaminants may be very effectively demetalized and desulfurized, with only moderate change in selectivity as the catalyst ages, by contact in the presence of hydrogen under hydrotreating conditions with a catalyst more fully described hereinbelow, comprising a hydrogenation component composited with a substantially non-acidic alumina support consisting essentially of a mixture of gamma alumina with Delta and/or Theta phase alumina, the catalyst being further characterized by a particular pore size distribution. In particular, the catalyst has at least 45% of its pore volume in pores 30 to 150 Å diameter, at least 10% of its pore volume in pores less than 30 Å diameter, at least 15% of its pore volume in pores greater than 300 Å diameter, and a surface area of 125 to about 210 m²/g (square meters per gram). The hydrogenation component preferably comprises the oxides or sulfides of a Group VIB metal and an iron group metal, as more fully described hereinbelow.

For best results in the process of this invention, the catalyst has a total pore volume of 0.4 to 0.65 cc/gm (cubic centimeters per gram of catalyst), and has at least about 10% of its pore volume in pores greater than 150 Å up to 300 Å diameter.

The pore volumes referred to herein, with the exception for pores less than 30 Å diameter, are those volumes determined by mercury porosimeter using techniques well known to those skilled in the art of catalyst preparation. Pore volume in pores less than 30 Å is determined by subtracting the pore volume accessible to mercury from the total pore volume determined independently.

With the specified catalyst, and under the rection conditions hereinafter to be described, high efficiency for both demetalation and desulfurization are achieved with unusually slow aging, in balanced fashion, of both these conversions.

The catalyst of this invention is prepared by a sequence of calcining procedures, more fully described hereinafter, that induces the formation of Delta and/or Theta phase alumina.

BRIEF DESCRIPTION OF THE INVENTION

Figure 3:
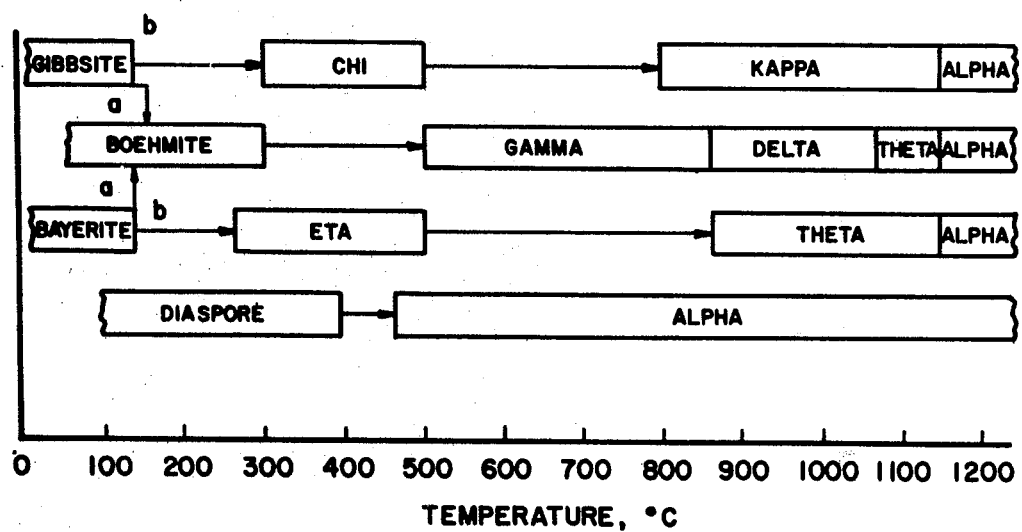
FIG. 3 is an alumina phase transformation diagram.

The catalyst of this invention is prepared by precalcining a high-porosity gamma type alumina, or an alumina hydrate such as boehmite, at a sufficiently high temperature, as hereinafter described, to induce the formation of Delta and/or Theta phase alumina; intimately mixing this precalcined alumina with a boehmite type alumina hydrate; and, recalcining the mixed aluminas to dehydrate the boehmite and convert it to gamma alumina. The hydrogenation component is introduced at one or more appropriate stages during or after the preparation of the alumina support, as will be illustrated hereinafter. FIG. 3 of the drawing illustrates the temperatures at which suitable forms of alumina are transformed to the Delta and/or Theta phase, or to the gamma phase, as described by Newsome et al in "Alumina Properties" published by Alcoa Research Laboratories, 1960. As a result of the particular calcination and mixing sequences utilized in this invention, an alumina support is formed that consists essentially of an intimate mixture of gamma alumina with Delta and/or Theta phase alumina. The Delta and Theta alumina phases are formed at high temperatures, as shown in FIG. 3. The expression "Delta and/or Theta phase", as used herein, signifies either phase alone or both phases together. Thus, the intimate mixture contemplated include gamma with Theta, gamma with Delta, and gamma with both Delta and Theta phases.

DETAILED DESCRIPTION OF THE INVENTION

The hydrocarbon feed to the process of this invention can be a whole crude. However, since the high metal and sulfur components of a crude oil tend to be concentrated in the higher boiling fractions, the present process more commonly will be applied to a bottoms fraction of a petroleum oil, i.e., one which is obtained by atmospheric distillation of a crude petroleum oil to remove lower boiling materials such as naphtha and furnace oil, or by vacuum distillation of an atmospheric residue to remove gas oil. Typical residues to which the present invention is applicable will normally be substantially composed of residual hydrocarbons boiling above 650° F. and containing a substantial quantity of asphaltic materials. Thus, the chargestock can be one having an initial or 5 percent boiling point somewhat below 650° F., provided that a substantial proportion, for example, about 70 or 80 percent by volume, of its hydrocarbon components boil above 650° F. A hydrocarbon stock having a 50 percent boiling point of about 900° F. and which contains asphaltic materials, 4% by weight sulfur and 51 ppm nickel and vanadium is illustrative of such chargestock. Typical process conditions may be defined as contacting a metal and/or sulfur contaminant containing chargestock with this invention's catalyst under a hydrogen pressure of about 500 to 3000 p.s.i.g., at 600° to 850° F. temperature, and 0.1 to 5 LHSV (i.e. 0.1 to 5 volumes of chargestock per volume of catalyst per hour).

The hydrogen gas which is used during the hydrodemetalation-hydrodesulfurization is circulated at a rate between about 1,000 and 15,000 s.c.f./bbl. of feed and preferably between about 3,000 and 8,000 s.c.f./bbl. The hydrogen purity may vary from about 60 to 100 percent. If the hydrogen is recycled, which is customary, it is desirable to provide for bleeding off a portion of the recycle gas and to add makeup hydrogen in order to maintain the hydrogen purity within the range specified. The recycled gas is usually washed with a chemical absorbent for hydrogen sulfide or otherwise treated in known manner to reduce the hydrogen sulfide content thereof prior to recycling.

For the purpose of this invention, it is preferred to operate with catalyst particles such as 1/32" extrudate or the equivalent disposed in one or more fixed beds. Furthermore, the catalyst described herein may be effectively used as the sole catalyst in the process of this invention. Alternatively, a dual bed arrangement such as described in U.S. Pat. No. 4,016,067 issued Apr. 5, 1977 may be used. The catalyst may be presulfided, if desired, by any of the techniques known to those skilled in the art.

The process of this invention is illustrated by aging tests using an atmospheric residual oil from Light Arabian crude. Each of the aging runs was performed at 2000 psi hydrogen pressure, 0.4–0.5 L.H.S.V. space velocity and 5000 SCF/B hydrogen circulation. Temperatures were initially set at 725° F., and then adjusted to maintain below 2 ppm metals (nickel+vanadium) and below 0.5% at sulfur in the hydrotreated products. The Light Arabian chargestock contained 25 ppm metals and 2.7 wt.% sulfur.

The properties of the catalysts used in the tests are summarized in Table 1. Catalysts A and B are illustrative of the present invention. Catalyst C is a prior art catalyst of the type described in U.S. Pat. No. 3,876,523 issued Apr. 8, 1975 and characterized by good initial activity for both demetalation and desulfurization. Catalyst D is a commercial hydrodesulfurization catalyst with too low a demetalation activity to be useful in the process of this invention.

TABLE 1

| Catalyst Properties | | | | |
|---|---|---|---|---|
| | | | Prior Art | |
| | A | B | C | D |
| Catalyst | (SMO 8112) | (SMO 8114) | | |
| CoO, wt.% | 3.5 | 3.5 | 3.4 | 3.4 |
| MoO$_3$, wt.% | 9.7 | 9.7 | 10.6 | 13.4 |
| Surface Area, m$^2$/g | 196 | 144 | 104 | 286 |
| Real Density, g/cc | 3.32 | 3.41 | 3.64 | 3.33 |
| Particle Density, g/cc | 1.22 | 1.28 | 1.31 | 1.15 |
| Pore Volume, cc/g | .52 | .49 | .49 | .49 |
| % of pore volume in pores with diameters (A) | | | | |
| 0–30 | 13 | 12 | 4 | 7 |
| 30–50 | 15 | 5 | 2 | 28 |
| 50–100 | 40 | 29 | 8 | 62 |
| 100–200 | 7 | 23 | 67 | 1 |
| 200–300 | 7 | 12 | 10 | 0 |
| 300+ | 17 | 19 | 9 | 2 |
| | 100 | 100 | 100 | 100 |

Figure 1:
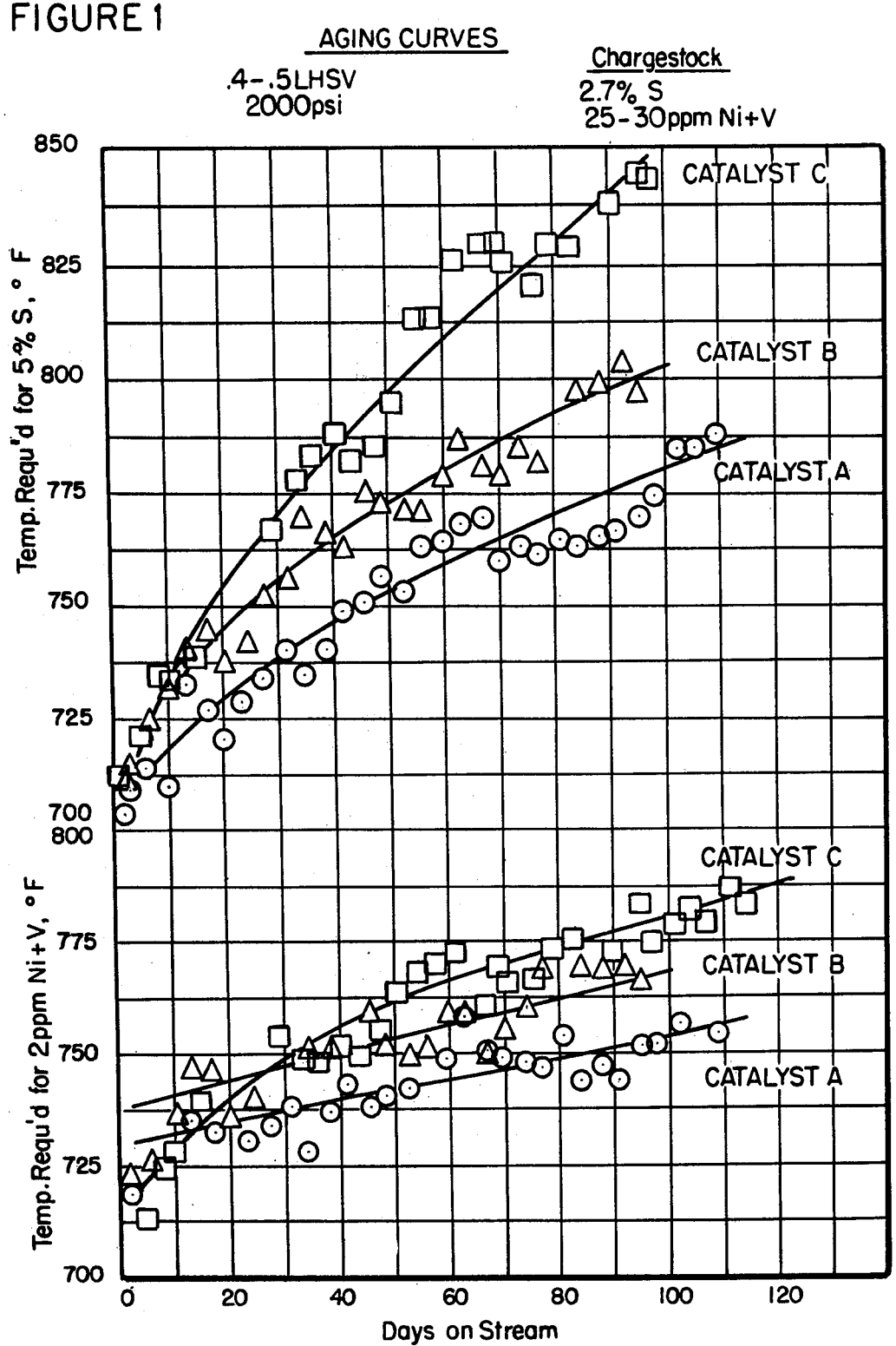
FIG. 1 is a set of aging curves.
Figure 2:
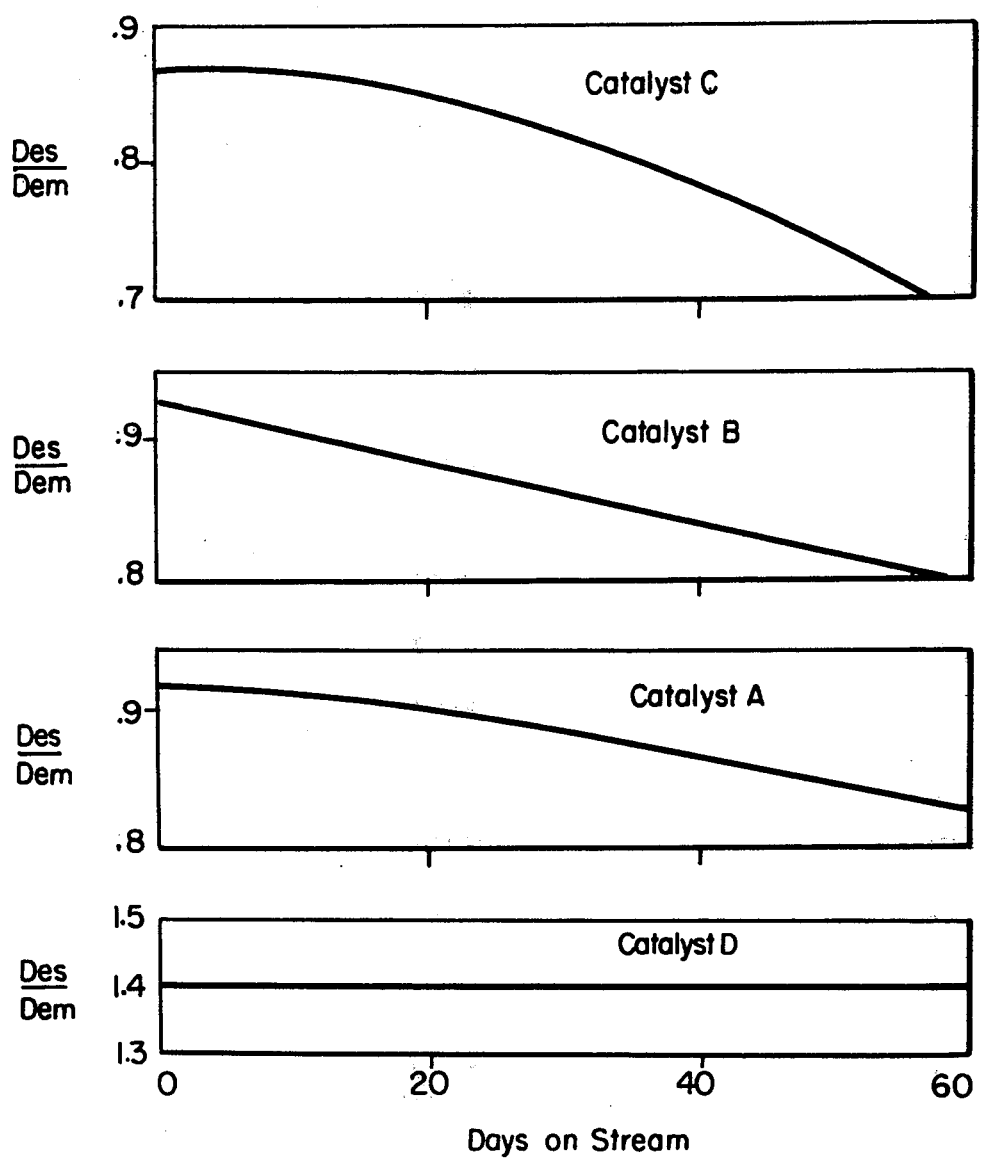
FIG. 2 is a set of curves showing changes in selectivity with days on stream.

The results of the aging tests are summarized in FIGS. 1 and 2 of the drawing. The improved aging behavior of the process of this invention and the initially good balance of desulfurization and demetalation activities, which allow a low start-of-run temperature, are shown in FIG. 1. FIG. 2 of the drawing shows the improved maintenance of the initial balance of activities with the process of this invention as compared with Catalyst C which has an initially good balance. Catalyst D maintaines its initial balance with aging, but has little or no useful life because of its very limited demetalation activity.

The catalyst useful in this invention comprises a hydrogenation component composited with a support consisting essentially of an intimate mixture of gamma alumina with Delta and/or Theta phase alumina. The hydrogenation component can be any known material or combination thereof effective to demetalize and desulfurize the chargestock under the reaction conditions described herein. The preferred and commonly used hydrogenation component comprises the oxides or sulfides of an iron group metal and a Group VIB metal. The iron group metals as used herein include iron, cobalt, and nickel, of which cobalt and nickel are particularly preferred; and the Group VIB metals include chromium, molybdenum, and tungsten, of which molybdenum and tungsten are particularly preferred. Particularly preferred combinations include cobalt and molybdenum or nickel and molybdenum. The catalyst compositions contain the preferred combinations of metals, computed as oxide and based on total weight of catalyst, in amounts of about 2 wt.% to about 6 wt.% cobalt oxide (CoO) or nickel oxide (NiO) and from about 8 wt.% to about 16 wt.% molybdenum trioxide (MoO$_3$), the remainder being the alumina support. Compositing the hydrogenation component with the alumina may be done by any of the impregnation or other compositing techniques known in the art. The alumina support preferably is of the non-acidic type, and in particular should contain less than 0.5 wt.% silica.

Catalysts having the pore size distribution of this invention are prepared by calcining preferably a low density gamma alumina at a temperature of 1600° F. to 2000° F. for 0.25 to 10 hours to induce the formation of some high temperature Delta or Theta phase alumina. The preferred low density alumina has at least 35% of its pore volume in pores greater than 100 Å diameter. The product is ground, if necessary, to pass a standard 100 mesh Tyler sieve. This powder is then mixed with 40% to 125% of its own weight, on an anhydrous basis, of alpha-alumina monohydrate powder, sometimes known as technical grade Boehmite, sold commercially as Catapal SB. The composite is pelleted or extruded and recalcined 1 to 20 hours at a temperature 900° F. to 1400° F. to convert the alpha-alumina monohydrate to the gamma form alumina. This procedure, involving a first calcination, mixing, and a second calcination, as prescribed, forms the support which consists essentially of an intimate mixture of gamma alumina Delta and/or Theta phase alumina. Impregnation with salts of the hereinabove described metals may be done at various stages in the preparation. The catalysts of this invention also may be prepared by calcining technical grade Boehmite at 1600° F. to 2000° F. for 0.25 to 10 hours to induce the formation of an alumina comprising Delta and/or Theta phase alumina, compositing the calcined product with 40% to 125% of its own weight, on an anhydrous basis, of alpha-alumina monohydrate, pelleting or extruding the composite, and calcining the pellets or extrudate for 1 to 20 hours at 900° F. to 1400° F.

Preparation of the catalysts of this invention are described in the examples which follow, it being understood that these are illustrative and no way restricting on the scope of this invention. Parts are by weight on an anhydrous basis unless specified to be otherwise.

EXAMPLE I (SMO-8112)

The following example illustrates the preparation of one catalyst of this invention.

Nine-hundred grams of a high porosity, low density gamma alumina is placed in a shallow dish, rapidly brought to 1950° F., and held at that temperature for 2 hours to induce formation of Delta and/or Theta phase alumina. The following Table A shows the changes in physical characteristics that occurred in the calcining procedure.

TABLE A

| | | | | Calcined | |
|---|---|---|---|---|---|
| Pore Volume in Pores of | | Gamma cc/g | Alumina % | Gamma cc/g | Alumina % |
| 0–30A | diameter | (0.126) | 13.0 | 0.128 | 17.7 |
| 30–50 | " | 0.035 | 3.6 | 0.011 | 1.5 |
| 50–80 | " | 0.165 | 17.2 | 0.005 | 0.7 |
| 80–100 | " | 0.138 | 14.3 | 0.005 | 0.7 |
| 100–150 | " | 0.287 | 29.9 | 0.024 | 3.3 |
| 150–200 | " | 0.105 | 10.9 | 0.108 | 14.9 |
| 200–300 | " | 0.034 | 3.5 | 0.187 | 25.9 |
| 300+ | " | 0.073 | 7.6 | 0.255 | 35.3 |

TABLE A-continued

| Pore Volume in Pores of | Gamma Alumina cc/g | Gamma Alumina % | Calcined Gamma cc/g | Calcined Alumina % |
|---|---|---|---|---|
| | (0.966) | 100.0 | 0.723 | 100.0 |

The calcined product was milled and screened to pass through a 100 mesh Tyler standard sieve.

250 grams of the powder was placed in a laboratory mixer, and 138 milliliters of solution containing 37.1 grams of ammonium molybdate (para) $(NH_4)_6Mo_7O_{24}\cdot 4H_2O$. was added and allowed to mix for one quarter hour. To the material in the mixer was then added 501 grams (on an anhydrous basis) of Boehmite, (Continental Oil Company, Catapal SB) which is an alpha alumina monohydrate 477 milliliters of a solution that contained 74.2 grams of ammonium molybdate was then added to the contents of the mixer and allowed to mix for an additional one quarter of an hour. The material was then extruded to form 1/32" diameter pellets in an auger extruder. The extrudate was dried at 250° F. and the temperature was then raised to 1000° F. at 5° F. per minute and held at that temperature for three hours. The material at this point had a packed density of 0.62 g/cc and a water capacity (to incipient wetness) of 0.54 cc/g. To 450 g. of the material was added 242 milliliters of solution containing 63.4 grams of cobalt nitrate hexahydrate, which impregnated the pellets to incipient wetness. This material was then dried at 250° F. The dried pellets were heated at 5° F. per minute to 1000° F. and calcined at this temperature for 10 hours. The properties of the catalyst and the pore size distribution were as follows:

| | |
|---|---|
| Surface Area | 196 m²/g |
| Real Density | 3.32 g/cc |
| Particle density | 1.22 g/cc |
| Pore volume | 0.519 cc/g |
| Pore diameter(Av.) | 106A |
| Packed density | 0.69 g/cc |

The pore size distribution, determined by mercury porosimeter was as follows:

| Pore Volume in Pores of | | cc/g | % |
|---|---|---|---|
| 0–30 A | diameter | 0.068 | 13.1 |
| 30–50 | " | 0.080 | 15.4 |
| 50–80 | " | 0.179 | 34.5 |
| 80–100 | " | 0.028 | 5.4 |
| 100–150 | " | 0.015 | 2.9 |
| 150–200 | " | 0.023 | 4.4 |
| 200–300 | " | 0.036 | 6.9 |
| 300+ | " | 0.090 | 17.4 |
| | | 0.575 | 100.0 |

EXAMPLE II (SMO-8114)

High temperature calcined gamma alumina powder was prepared as in Example I. To 502 grams of this material was added 326 milliliters of solution containing 74.2 grams of ammonium molybdate. This material was blended in a Lancaster mixer for one-quarter hour. 336 grams (about 250 grams on an anhydrous basis) of alpha alumina monohydrate powder (Catapal SB, manufactured by Continental Oil Company) was added to the mixer follower by 213 milliliters of solution containing 37.1 grams of ammonium molybdate. After mixing for one-quarter hour, the blend was extruded as in Example I and dried and calcined at 1000° F. for three hours. This intermediate material had a packed density of 0.68 g/cc and a water capacity of 0.49 cc/g. To 450 grams of this intermediate product was added 223 milliliters of solution containing 63.4 grams of cobalt nitrate, $Co(NO_3)_2\cdot 6H_2O$. The impregnated intermediate was dried at 250° F., and calcined for 10 hours at 1000° F. The catalyst thus formed had the following properties:

| | |
|---|---|
| Packed density | 0.75 g/cc |
| Real density | 3.41 g/cc |
| Particle density | 1.28 g/cc |
| Pore volume | 0.490 cc/g |
| Pore diameter | 136A |
| Surface area | 144 m²/g |

The pore size distribution by mercury porosimeter was found to be:

| Pore Volume in Pores of | | cc/g | % |
|---|---|---|---|
| 0–30A | diameter | 0.059 | 12.0 |
| 30–50 | " | 0.027 | 5.5 |
| 50–80 | " | .074 | 15.1 |
| 80–100 | " | 0.068 | 13.9 |
| 100–150 | " | 0.068 | 13.9 |
| 150–200 | " | 0.043 | 8.8 |
| 200–300 | " | 0.059 | 12.0 |
| 300 | " | 0.092 | 18.8 |
| | | 0.530 | 100.0 |

EXAMPLE III (SMO-8454)

1800 grams of alpha alumina monohydrate powder (Catapal SB) was calcined at 1700° F. for 15 minutes. 300 grams of the calcined product were blended in a mixer with 812 grams (600 g anhydrous basis) of uncalcined alpha alumina monohydrate powder. To the mixer was added 800 milliliters of solution containing 44.1 grams of aluminum nitrate nonahydrate and the blend allowed to mix for 10 minutes. The resultant blend was extruded as in Example I, and the extrudate dried at 250° F. The dried extrudate was calcined in flowing air for 4 hours at 1000° F., after heating up to temperature at 5° F. per minute. The resultant intermediate had the following properties:
Real Density—3.38 g/cc
Particle Density—1.06 g/cc
Pore volume—0.648 cc/g
Pore diameter—123 A
Surface area—211 m²/g To one hundred grams of this intermediate was added 65 milliliters of solution containing 13.9 grams of ammonium molybdate. The product was dried at 250° F. To this dried product was added 58 milliliters of solution containing 15.7 grams of cobalt nitrate crystals, $Co(NO_3)_2\cdot 6H_2O$. The cobalt impregnated material was dried at 250° F., heated to 1000° F. at the rate of 5° F. per minute, and calcined for 10 hours at 1000° F. This final catalyst had the following properties:
Packed Density—0.71 g/cc
Real Density—3.39 g/cc
Particle Density—1.21 g/cc
Pore Volume—0.531 cc/g
Surface Area—186 m²/g
Pore Diameter—114 A The distribution of pore diameters was as follows:

| Pore Volume in Pores of | | cc/g | % |
|---|---|---|---|
| 0–30A | diameter | 0.072 | 13.6 |
| 30–50 | " | 0.020 | 3.8 |
| 50–80 | " | 0.207 | 39.0 |
| 80–100 | " | 0.047 | 8.9 |
| 100–150 | " | 0.091 | 17.0 |
| 150–200 | " | 0.005 | 0.9 |
| 200–300 | " | 0.000 | 0.0 |
| 300+ | | 0.089 | 16.8 |
| | | 0.531 | 100.0 |

What is claimed is:

1. A method for preparing a hydrodemetalation-desulfurization catalyst which comprises: converting a gamma type alumina or alumina hydrate of the Boehmite variety to an alumina comprising Delta and/or Theta phase alumina, said conversion induced by a first calcination; intimately mixing said converted alumina with 40% to 125% of its weight of technical grade Boehmite; recalcining in a second calcination the composite to transform said admixed Boehmite to gamma alumina whereby forming a catalyst support consisting essentially of an intimate mixture of gamma alumina with Delta and/or Theta phase alumina, compositing with said catalyst support, in one or more steps, a Group VIB metal and an iron group metal in amounts effective to confer hydroprocessing activity to said support; and, recovering a catalyst having at least 45% of its pore volume in pores 30 to 150 Å diameter, at least 10% of its pore volume in pores less than 30 Å diameter, at least 15% of its pore volume in pores greater than 300 Å diameter, a surface area of 125 to about 210 m²/g, and a total pore volume of 0.4 to 0.65 cc/gm.

2. The method of claim 1 wherein said first calcination is conducted for 0.25 to 10 hours at a temperature from about 1600° F. to about 2000° F., thereby forming Delta and/or Theta phase alumina.

3. The method of claim 2 wherein said recalcining in said second calcination is done at a temperature of about 900° F. to about 1400° F. for from about 1 to about 20 hours, thereby converting said Boehmite to gamma alumina.

4. The method for preparing a hydrodemetalation-desulfurization catalyst as described in claim 2 wherein a low density gamma alumina having at least 35% of its pore volume in pores greater than about 100 Å diameter is subjected to said first calcination to convert it to said alumina comprising Delta and/or Theta phase alumina.

5. The method for preparing a hydrodemetalation-desulfurization catalyst as described in claim 4 wherein said Group VIB metal is molybdenum and said iron group metal is cobalt.

6. A hydrometalation-desulfurization catalyst comprising the oxides or sulfides of a Group VIB metal and an iron group metal on a support consisting essentially of an intimate mixture of gamma alumina with Delta and/or Theta phase alumina, said catalyst having from 45% to 65% of its pore volume in pores 30 to 150 Å diameter, at least 10% of its pore volume in pores less than 30 Å diameter, at least about 10% of its pore volume in pores greater than 150 Å up to 300 Å diameter, at least 15% of its pore volume in pores greater than 300 Å diameter, a total pore volume of 0.4 to 0.65 cc/gm, and a surface area of 125 to about 210 m²/g.

7. The hydrodemetalation-desulfurization catalyst described in claim 6 wherein the iron group metal is cobalt and the Group VIB metal is molybdenum, and wherein these metals are present in amounts, based on total catalyst weight, of about 2 wt.% to 6 wt.% cobalt oxide and about 8 wt.% to 16 wt.% molybdenum trioxide.

* * * * *

UNITED STATES PATENT AND TRADEMARK OFFICE
CERTIFICATE OF CORRECTION

PATENT NO. : 4,271,042
DATED : June 2, 1981
INVENTOR(S) : Stephen M. OLECK et al It is certified that error appears in the above-identified patent and that said Letters Patent are hereby corrected as shown below:

Column 3, Line 36, "rection" should be -- reaction --.
Column 7, Line 17, "monohydrate 477" should be -- monohydrate. 477 --.
Column 7, Line 39, "106A" should be -- 106Å --.
Column 7, Line 48, "0-30A" should be -- 0-30Å --.
Column 8, Line 15, "136A" should be -- 136Å --.
Column 8, Line 24, "0-30A" should be --0-30Å --.
Column 10, Line 24, "150A" should be -- 150Å --.
Column 10, Line 26, "30A" should be -- 30Å --.
Column 10, Line 27, "150A up to 300A" should be -- 150Å up to 300Å --.
Column 10, Line 29, "A" should be -- Å --.

Signed and Sealed this

Third Day of November 1981

[SEAL]

Attest:

GERALD J. MOSSINGHOFF

Attesting Officer          Commissioner of Patents and Trademarks